United States Patent

[11] 3,604,408

| [72] | Inventor | John C. Tescula<br>22810 Westwood Rd., Fairview Park, Ohio 44126 |
|---|---|---|
| [21] | Appl. No. | 853,674 |
| [22] | Filed | Aug. 28, 1969 |
| [45] | Patented | Sept. 14, 1971 |

[54] BARBECUE GRILL APPARATUS
6 Claims, 3 Drawing Figs.

| [52] | U.S. Cl. | 126/25 R, 126/9 R |
|---|---|---|
| [51] | Int. Cl. | A47j 37/00, F24b 3/00, F24c 1/16 |
| [50] | Field of Search | 126/9, 9 B, 25, 25 A |

[56] References Cited
UNITED STATES PATENTS

| 2,048,769 | 7/1936 | Anderson | 126/25 |
|---|---|---|---|
| 2,619,951 | 12/1952 | Kahn | 126/25 |
| 2,821,186 | 1/1958 | Peplin | 126/9 |
| 3,081,694 | 3/1963 | Lipsey | 126/9 X |
| 2,928,385 | 3/1960 | Peplin | 126/25 |

Primary Examiner—Charles J. Myhre
Attorney—Meyer, Tilberry and Body

ABSTRACT: A vertical-type barbecue grill comprised of a wire basket enclosed on the bottom and two vertical sides by a U-shaped sheet metal housing member. The basket and the housing are releasably connected by clip members formed on independent wire legs arranged to support the unit in the proper orientation for cooking. Supported wires extend outwardly from the legs for adjustably supporting food holders adjacent the open sides of the basket.

INVENTOR.
JOHN C. TESCULA

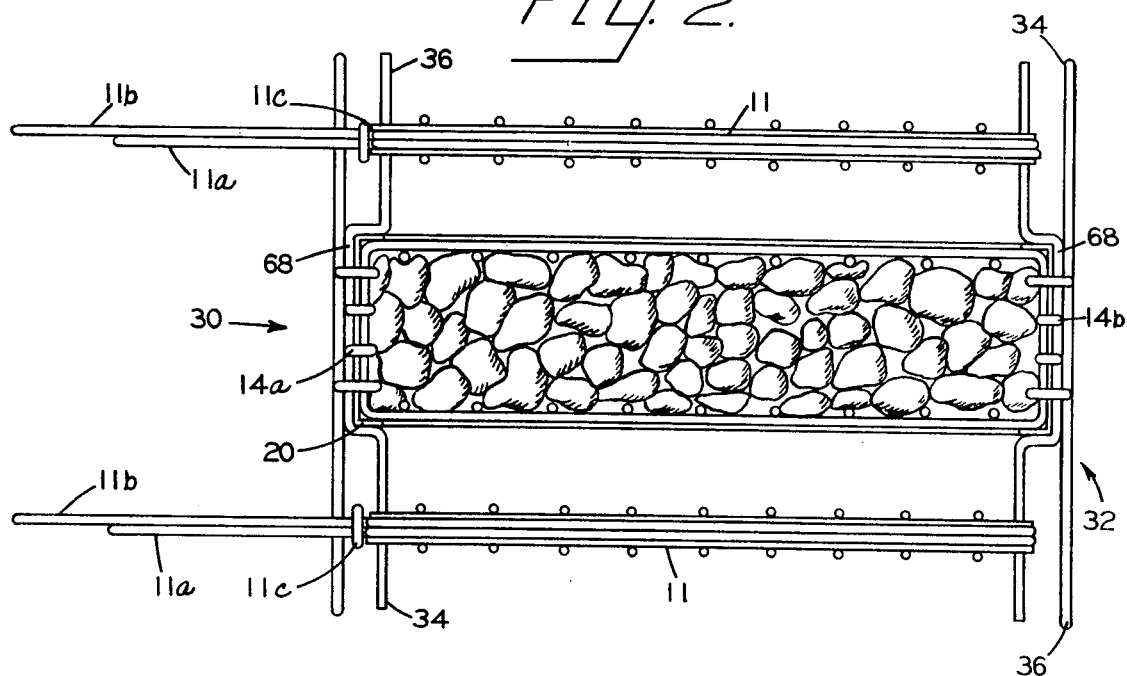
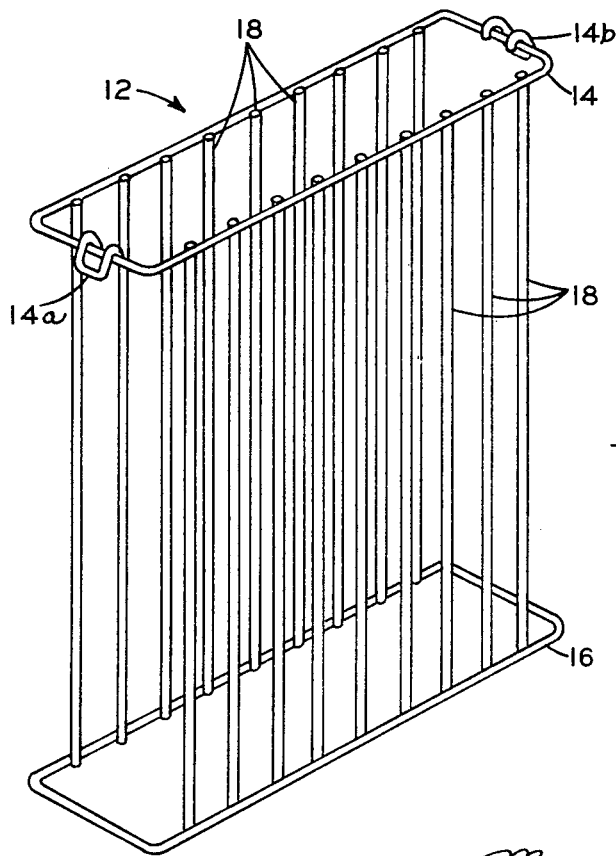

BARBECUE GRILL APPARATUS

The present invention is directed toward the barbecue grill art and, more particularly, to a collapsible, vertical-type grill unit.

In my prior U.S. Pat. No. 2,855,918, I have disclosed a charcoal broiler which comprises a vertically extending basket formed from an elongated U-shaped strip of metal having screen or expanded metal welded to its open sides. Wire or rod legs are welded to the opposite ends of the basket and positioned to support the basket with the ends of the screen sides extending vertically. Additional spaced rods are welded at the upper end of the basket and extend perpendicularly to the screen sides. The charcoal or other fuel can be placed within the basket and ignited to provide an even glowing radiant heat through the screen. Food holders are supported from the perpendicularly extending spaced rods to hold the meat or other food the desired distance from the heat to assure proper cooking.

The subject invention provides an improvement to the general type of grill described. In particular, according to the the subject invention the grill comprises an elongated wire basket of generally rectangular cross section. The basket is open at at least one end and an elongated U-shaped strip of sheet metal extends about the bottom and ends of the basket. Legs are provided which have clip portions adapted to releasably engage both the sheet metal strip and the wire basket to clamp the two together into a unitary structure and to support the basket in proper position for use as a vertical grill.

Accordingly, a primary object of the invention is to provide a compact and portable vertical-type charcoal broiler assembly which incorporates a minimum number of parts and can be readily disassembled for cleaning and storage.

Another object is the provision of the grill of the type described which is extremely simple to manufacture and which does not require complex assembly techniques.

Yet another object is the provision of a grill of the general type described wherein the leg members function to lock the various parts in their assembled relationship.

A still further object is the provision of a vertical-type barbecue grill which can be easily manufactured without the use of expensive and complicated techniques and which can be easily assembled and disassembled.

The above and other objects and advantages will become apparent from the following description when read in conjunction with the accompanying drawings wherein:

FIG. 2 is a plan view of the vertical broiler assembly shown in FIG. 1 showing the same being used for broiling; and, FIG. 3 is a pictorial view showing the wire basket portion of the assembly.

Figure 1:
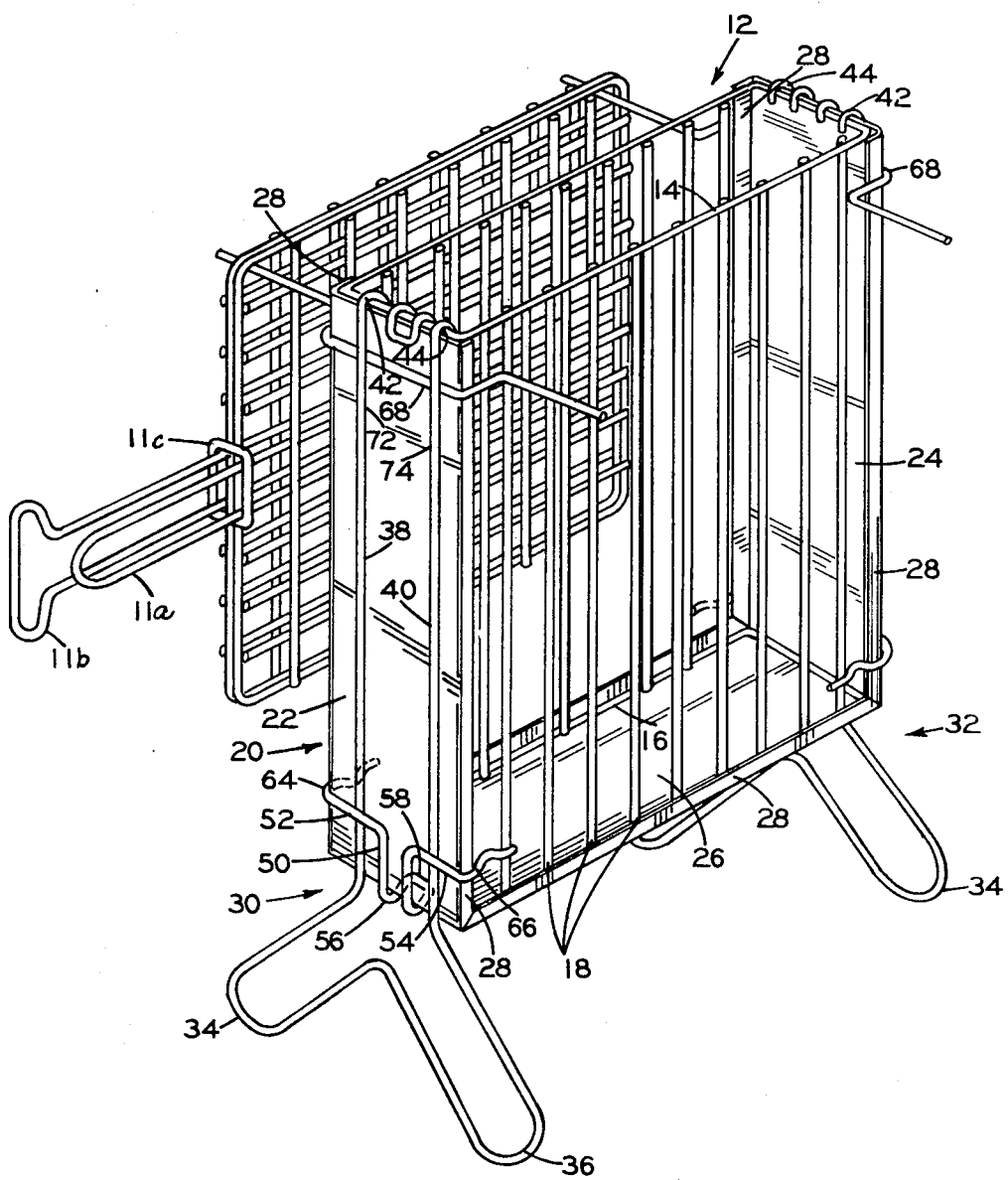
FIG. 1 is a perspective view of a preferred embodiment of a vertical broiler assembly formed in accordance with the present invention.

Referring more particularly to FIG. 1 of the drawings, the overall arrangement of the grill 10 can best be understood. Although the actual details of construction of the invention could vary, as shown in FIG. 1, the assembly preferably comprises a vertically arranged wire basket member 12. As best shown in FIG. 3, the basket 12 include two generally rectangular wire rings 14 and 16. The rings 14 and 16 are connected by vertically extending wires or rods 18 which are welded at their upper and lower ends to the rings 14,16. Additionally outwardly extending clips 14a and 14b are formed on ring 14. This provides a basket or frame which is open at its opposite ends and generally sidewalls. The wires 18 are spaced a distance of from one-half to 1 inch apart so that the customary charcoal briquettes can be retained within the interior of the basket.

Extending about the open lower end and the sides of the basket member 12 is a generally U-shaped sheet metal housing member 20. The housing member 20 includes vertical end walls 22, 24 connected by a lower wall 26. As can be seen, the housing member 20 is formed from a continuous strip of sheet metal and is preferably provided with flanges 28 which extend inwardly from the exterior edges. The flanges 28 are mitered at the juncture between the bottom walls 20 and the vertical end walls 22,24. The uppermost ends of the walls 22,24 are arranged to be slidably received under the clips 14a and 14b. The opposed end walls of the sheet metal frame prevent undue radiation of heat from the burning charcoal in the directions not used for cooking.

Of particular importance to the invention is the arrangement whereby the box member 20 and the basket member 12 are rigidly and releasably interconnected by the two leg assemblies 30 and 32. Each of the leg assemblies 30,32 are preferably of identical construction. Consequently, only one of the leg assemblies will be described in detail and the description thereof is to be taken as equally applicable to the other unless otherwise noted. Referring to FIGS. 1 and 2, it will be noted that the leg member 30 is a wire rod assembly including two lower loops 34,36 and the vertically extending portions 38,40. At their upper ends, the portions 38,40 are bent over into relatively tight loops or hooks 42,44 the hooks or loops 42,44 are arranged so as to closely hook over and engage the top wire loop 14 of the basket 12 and the top end of the sheet metal housing 22 to firmly hook the two together. Positioned at the lower end of the vertical wire portions 38,40 is a clip and basket supporting loop wire member 50. This member is spot welded at locations 52,54 to the vertically extending leg portions, 38,40 respectively. As shown the member 50 has a center portion 56 which is bent downwardly and inwardly to provide a basket supporting tab 58. Additionally, the two horizontally extending portions 52,54 of the member 50 are bent-in, to provide two inwardly extending portions 64,66. The inwardly extending portions 64,66 are arranged so as to resiliently clip the vertical sidewalls 22 to the end wires 18 of the basket 12. As can be appreciated, this arrangement resiliently clips the legs to the basket while rigidly interconnecting the basket to the sheet metal housing member 20.

Formed integrally with the leg structure are means for supporting food holders 11 in the proper relationship with the open sides of the basket. As shown, these means comprise a wire or rod member 68 spot welded to the vertical portions 38 and 40 of the leg assembly 30 at locations 72,74. At each side the rod is bent inwardly at right-angles to closely engage the opposite edges of the vertical sides of the sheet metal member and the outermost wires 18 on the basket. This further locks the basket into position while providing a support for the food holder member 11.

Although not previously discussed, the food holders are preferably of the type described in detail in my previously mentioned patent. As shown, they each take the form of two-wire grill members having outwardly extending handle portions 11a and 11b. At their ends opposite from the handles the wire grill members are interconnected so that they can be pivoted together to retain food therebetween. Additionally, the handles are provided with a slip ring 11c which is slidably retained on the handle 11b. As is seen, the handle 11a is shorter than the handle 11b so that the ring can be slid to the other end of the handle 11a to permit handle 11b to be opened.

As shown in FIG. 2, when charcoal is placed within the fire box and ignited it will produce and even glowing fire which radiates heat outwardly through the vertical wire sidewalls. Food positioned in the food holders 11 is, of course, cooked by the radiant heat generated by the burning charcoal. The food holders can be slidably moved along the outwardly extending rods 68 to vary the spacing from the burning charcoal.

Preferably, the rods 68 are of a length such that they extend outwardly from the vertical centerline of the unit a distance substantially equal to the divergent portions 34,36. Thus the grill can be positioned on its side so that grilling can take place horizontally or, alternately, the grill can be used for heating cooking pans or coffee pots.

To disassemble the unit for transportation or cleaning, it is necessary merely to grab the divergent leg portions of the leg assemblies 30 and pull outwardly. The clips 64,66 are thus snapped over the wires 18 and the vertical edges of the sides 22,24. The upper end clips 42,44 can then be slipped vertically upwardly releasing the leg assemblies from the box. The sheet metal member can then be slipped off of the wire basket.

As can be appreciated from the foregoing description, the subject device is extremely simple in construction and can be formed without the use of any special forming techniques. Additionally, the unit can be assembled and disassembled without the use of professional tools or connecting elements.

I claim:

1. A vertical-type barbecue grill comprising: a vertically elongated wire basket member of a generally rectangular cross-sectional configuration including front and rear portions, two side portions, a bottom portion and a top portion; a generally U-shaped sheet metal member removably engaged about said bottom portion and said two side portions; and, at least one leg member associated with each of said two vertical side portions for supporting said barbecue, each said leg member including means for engaging its associated side portion at said top portion and resilient clip portions for releasably engaging said basket member and said sheet metal member.

2. The grill as defined in claim 1 wherein said leg members include tab portions which extend inwardly under said basket member.

3. The grill as defined in claim 2 wherein said resilient clip portions are disposed on said legs adjacent said bottom portion, each of said legs including two of said resilient clip portions, one of said clip portions engaging said front portion and the other of said clip portions engaging said rear portion, each of said resilient clip portions including a generally horizontal portion extending from its associated leg member transversely across at least a portion of the associated side portion and an inwardly extending portion extending transversely across at least a portion of the associated front or rear portion and in engagement therewith to resiliently interconnect said legs to said side portions and to rigidly connect said basket member to said sheet metal member.

4. The grill as defined in claim 6 wherein said two resilient clip portions and said tab portions are formed integral with each other and comprise a wirelike member affixed to each of said leg members.

5. The grill as defined in claim 1 wherein said leg members further include wire portions which extend laterally thereof for supporting food holders adjacent the wire basket member.

6. The grill as defined in claim 1 wherein said sheet metal member has flanges which extend inwardly toward said basket member.